United States Patent [19]

Seita et al.

[11] 4,119,590
[45] Oct. 10, 1978

[54] PROCESS FOR PRODUCING A POLYION COMPLEX HAVING A NUCLEIC ACID BASE

[75] Inventors: Toru Seita; Akihiko Shimizu; Yujiro Kosaka, all of Shin-nanyo, Japan

[73] Assignee: Toyo Soda Manufacturing Co., Ltd., Japan

[21] Appl. No.: 809,011

[22] Filed: Jun. 22, 1977

Related U.S. Application Data

[62] Division of Ser. No. 687,220, May 17, 1976, Pat. No. 4,066,827.

[30] Foreign Application Priority Data

| May 22, 1975 | [JP] | Japan | 50-60241 |
| May 22, 1975 | [JP] | Japan | 50-60242 |
| May 27, 1975 | [JP] | Japan | 50-62533 |

[51] Int. Cl.$^2$ ............................................. C08L 89/00
[52] U.S. Cl. ..................................... 260/8; 260/17 R; 260/17 A; 260/857 R; 526/317
[58] Field of Search .................. 260/17 R, 8; 526/317

[56] References Cited

U.S. PATENT DOCUMENTS

| 3,778,393 | 12/1973 | Greber et al. | 260/17.4 |
| 3,929,750 | 12/1975 | Eishun et al. | 526/317 |
| 3,963,662 | 6/1976 | Fujiwara et al. | 260/47 UA |

Primary Examiner—Edward M. Woodberry
Attorney, Agent, or Firm—Oblon, Fisher, Spivak, McClelland & Maier

[57] ABSTRACT

A polyion complex is produced by reacting a weak acid type or a strong acid type polyanion polymer with a nucleic acid base-containing polycation polymer.

10 Claims, No Drawings

PROCESS FOR PRODUCING A POLYION COMPLEX HAVING A NUCLEIC ACID BASE

This is a division of application Ser. No. 687,220 filed May 17, 1976, now U.S. Pat. No. 4,066,827.

BACKGROUND OF THE INVENTION

1. FIELD OF THE INVENTION

The present invention relates to a process for producing a nucleic acid base-containing polyion complex.

2. DESCRIPTION OF THE PRIOR ART

Processes for producing nucleic acid base-containing polyion complexes have been known in the past. The present inventors have succeeded in producing nucleic acid base-containing polyion complexes which are quite different from the conventional polyion complexes and have various advantageous characteristics and utilities.

SUMMARY OF THE INVENTION

It is an object of the present invention to provide a process for producing novel polyion complexes which are useful as resins for separation and purification of nucleic acid-containing components such as proteins, nucleic acid bases, nucleosides, etc., and derivatives thereof.

This and other objects of this invention as will hereinafter become clear have been attained by producing a novel polyion complex by reacting a weak acid type or strong acid type polyanion polymer with a nucleic acid base-containing polycation polymer. Suitable polyanion polymers include polycarboxylic acids or salts thereof.

DETAILED DESCRIPTION OF THE PREFERRED EMBODIMENTS

The polyion complexes produced by the process of this invention have the following characteristics as compared with conventional polyion complexes.

(1) The polyion complexes of this invention comprise nucleic acid bases which have special biochemical characteristics. Accordingly, synergistic effects between the bases and the hydrogen bonds between adenine $\rightleftarrows$ thymine(uracil) and guanine $\rightleftarrows$ cytosine can be effectively utilized to enable use of the polyion complexes as resins for separation of these compounds. The usefulness of the complexes for this purpose is quite broad in comparison with that of the conventional polyion complexes.

(2) Certain of the structures of this invention have a secondary hydroxyl group whereby cross-linking by various techniques is possible.

(3) Conventionally, in preparations of nucleic acid base-containing polymers, it is difficult to produce species having high molecular weight by using vinyl polymerization or polycondensation. However, the nucleic acid base-containing polyion complexes produced by the process of this invention have remarkably high molecular weights since a reaction of polymers is involved.

Suitable polyanion polymers for use in the process of this invention include weak acid type or strong acid type polyanion polymers such as polyacrylic acid, polymethacrylic acid, polystyrenesulfonic acid, polyvinylsulfonic acid, polymaleic acid, copolymers of acrylic acid, methacrylic acid or maleic acid, carboxymethyl cellulose, alginic acid, poly-L-aspartic acid, poly-L-glutamic acid and alkali metal salts thereof. Suitable polycation polymers for use in the process of this invention include the polymers having the following unit formulae:

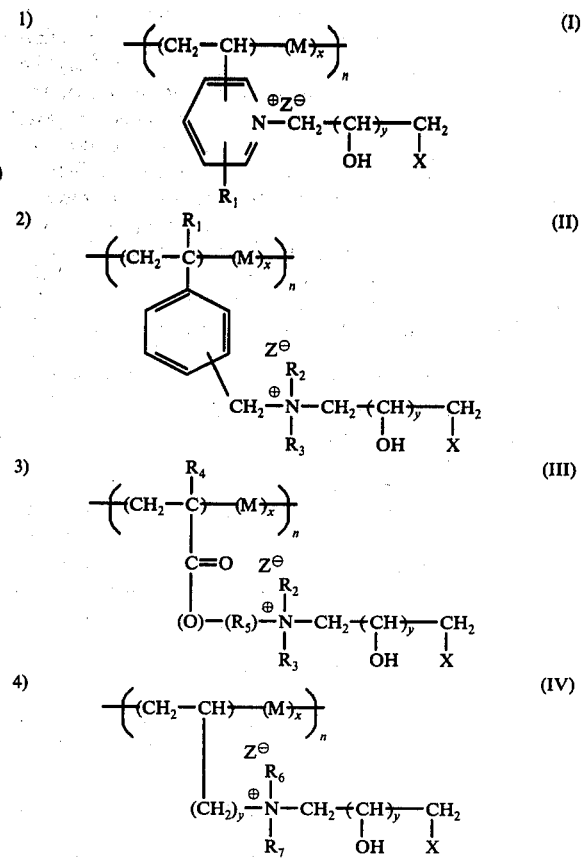

wherein $R_1$ represents a hydrogen atom or a $C_{1-4}$ alkyl group; $R_2$ and $R_3$ both respectively represent a $C_{1-10}$ hydrocarbon group; $R_4$ represents a hydrogen atom or methyl group; $R_5$ represents a $C_{1-6}$ alkyl group; $R_6$ and $R_7$ both respectively represent a $C_{1-4}$ alkyl group; M represents a vinyl monomer; $x$ is 0 or another desirable value determined by conventional considerations; Z represents a halogen atom (e.g., F, Cl, Br or I) or an hydroxyl group; $y$ is 0 or 1; $n$ is an integer higher than 2, preferably higher than 10; and X represents adenine, thymine, cytosine, uracil or a derivative thereof in which a purine nucleus is bonded to the 9-position and a pyrimidine nucleus is bonded to the 1-position. $n$ is usually less than 500,000 and $x$ is usually less than 450,000.

Suitable monomers for forming the vinylpyridine unit in the unit formula (I) include 2-vinylpyridine, 3-vinylpyridine, 4-vinylpyridine, 2-ethyl-6-vinylpyridine, 5-ethyl-2-vinylpyridine, 5-butyl-2-vinylpyridine, 2-methyl-5-vinylpyridine, 3-methyl-5-vinylpyridine and the like. Suitable monomers M include aliphatic or aromatic vinyl monomers such as styrene; substituted styrene e.g., -methyl styrene; acrylonitrile; substituted acrylonitrile, e.g., methacrylonitrile; vinyl acetate, acrylic acid, methacrylic acid and the like, excluding electrolyte polymers.

In the process for producing the novel polyion complexes of this invention an aqueous solution of an alkali metal silicate may simply be mixed with the nucleic acid base-containing polycation polymer. The nucleic acid base-containing polycation polymer and the polyanion polymer can be dissolved in water, a water miscible organic solvent or a mixture thereof. Suitable organic solvents include methanol, ethanol, butanol, acetone, tetrahydrofuran, N, N'-dimethylformamide and the like. The order of the addition is not critical. For example, the solution of the polycation polymer may be added to the solution of the polyanion polymer or the latter may be added to the former. The same purpose may be effected by adding a solid form of one component to a solution of the other component. However, using this technique, the resulting polyion complex is not uniform, does not have a uniform composition and suffers from a low reproducibility. Accordingly, it is not a preferred method. Suitable concentrations of the solutions of both the polycation polymer and the polyanion polymer are each in the range of from 0.1 to 70 wt.%, preferably 1 to 15 wt.%. Suitable temperatures for mixing both solutions are in the range of from 0° to 90° C., preferably from room temperature to 50° C. The equivalent ratio of the polycation polymer relative to the polyanion polymer is in the range of from 0.05 to 20.

The polyion complexes produced by the process of this invention are novel compounds in white solid form. They are useful as resins for use in separation and purification of proteins, nucleic acid bases, nucleosides, nucleotides, oligonucleotides and the like and also are useful for formation of membranes of polyion complexes. The fields of application are wide.

Having generally described the invention, a more complete understanding can be obtained by reference to certain specific examples, which are provided herein for purposes of illustration only and are not intended to be limiting unless otherwise specified.

EXAMPLE 1

In a 2 liter pressure bottle, 1 g of polycation polymer having the unit formula

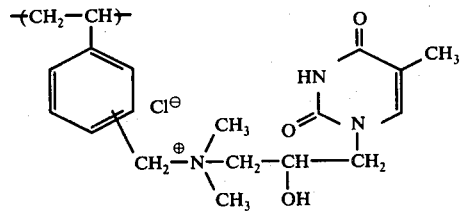

which was produced by heating polyvinylbenzyldimethylamine (MW 4 × 10$^5$) and 1-(2'-hydroxy-3-chloropropyl) thymine in N, N-dimethylformamide (68% quaternary degree), was dissolved in 400 ml of distilled water with stirring. In another 1 liter beaker, 1 g of sodium polystyrenesulfonate (MW 5 × 10$^5$) was dissolved in 400 ml of distilled water. The solution of sodium polystyrenesulfonate was added dropwise to the former solution in the 2 liter pressure bottle with stirring whereby a white precipitate was formed. After the addition, the mixture was further stirred for 1 hour and was kept for 30 minutes. The white precipitate was filtered and washed with a large amount of water, then washed with ethanol and with acetone and was dried in vacuum to obtain a white powdery polyion complex. An infrared spectrum analysis of the polyion complex, showed absorptionbands of a secondary hydroxyl group at 3250 cm$^{-1}$; of SO$_2$ at 1210 cm$^{-1}$ and 1040 cm$^{-1}$ and of thymine at 1656 cm$^{-1}$. The equivalent ratio of the polycation polymer relative to the polyanion polymer was 0.9 and the nitrogen content of the polyion complex was 7.67% according to an elementary analysis. Accordingly, the product was a polyion complex (substantially neutral) having the following structure:

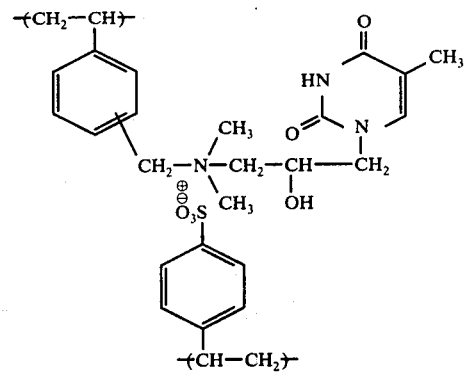

EXAMPLE 2

A 0.5 g sample of the polycation polymer of Example 1 was dissolved in 250 ml of distilled water. On the other hand, in a 1 liter beaker, 0.5 g of sodium polyacrylate (MW 2 × 10$^5$) was uniformly dissolved in 250 ml of distilled water to prepare a uniform solution. The solution of the polycation polymer was added dropwise to the polyanion polymer solution with stirring whereby a white powdery polyion complex was precipitated. The nature of the resulting polyion complex was confirmed by infrared spectrum analysis. According to an elementary analysis of the polyion complex, the nitrogen content was 9.80%. Accordingly, the product was shown to be a polyion complex (substantially neutral) having the following structure.

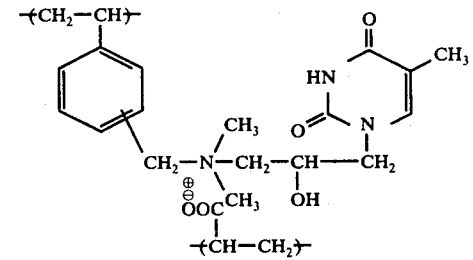

EXAMPLE 3

A 0.5 g sample of the polycation polymer having the formula

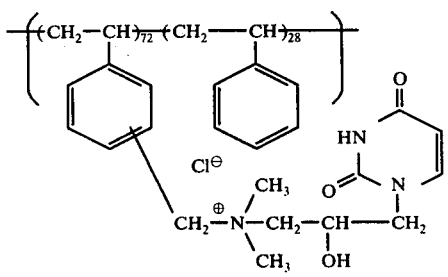

which was produced by heating vinylbenzyldimethylamine-styrene copolymer (MW 7 × 10$^5$) and 1-(2'- hydroxy-3'-chloropropyl)-uracile in N, N-dimethylformamide (70% quaternary degree), was dissolved in 300 ml of distilled water with stirring to prepare a uniform solution. In a 1 liter beaker, 0.5 g of sodium polyvinylsulfonate (MW $1 \times 10^4$) was dissolved in 200 ml of distilled water. In accordance with the process of Example 1, both solutions were mixed to obtain a white powdery polyion complex. According to an infrared spectrum analysis, the product was shown to be the polyion complex having the unit formula

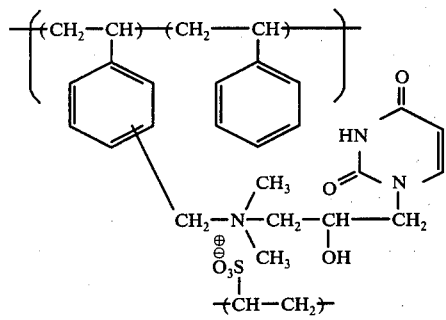

EXAMPLE 4

A 0.5 g sample of a polycation polymer having the unit formula

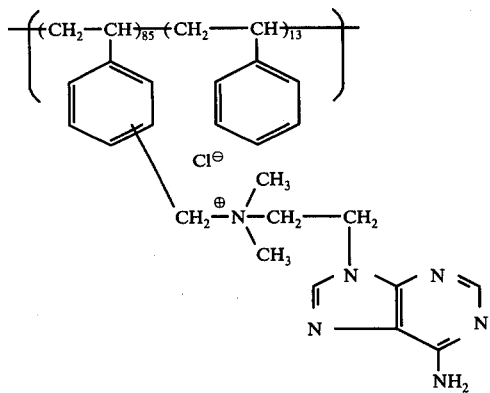

which was produced by heating vinylbenzyldimethylamine-styrene copolymer (MW $1 \times 10^5$) and 9-(2'-chloroethyl)-adenine in N, N-dimethylformamide (72% quaternary degree), was dissolved in 250 ml of distilled water with stirring to prepare a solution of a polycation. In a 1 liter beaker, 0.5 g of sodium polystyrenesulfonate (MW $5 \times 10^5$) was dissolved in 250 ml of distilled water to prepare a solution of a polyanion polymer. In accordance with the process of Example 1, both solutions were mixed to obtain a white powdery polyion complex. According to an infrared spectrum analysis, the product was shown to be the polyion complex having the unit formula

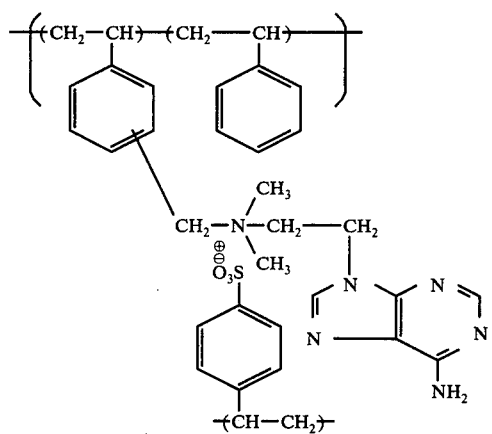

EXAMPLE 5

A 5 g sample of a polycation polymer having the unit formula

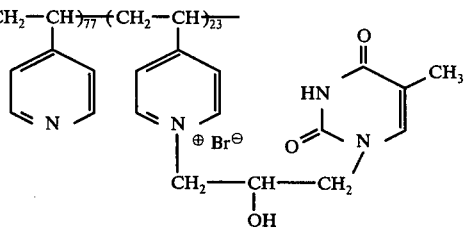

which was produced by heating poly-4-vinylpyridine (MW $1 \times 10^5$) and 1-(2'-hydroxy-3'-bromopropyl)-thymine in N, N-dimethylformamide, was dissolved in 500 ml of distilled water to prepare a solution of a polycation polymer. On the other hand, 1 g of polyacrylic acid (MW $8 \times 10^4$) was dissolved in 150 ml of distilled water to prepare a solution of a polyanion polymer. The solution of the polyanion polymer was added to the solution of the polycation polymer at room temperature with stirring, whereby a white precipitate was formed. The white precipitate was collected by filtration, washed with a large amount of water and then with acetone and was dried in vacuum. According to an infrared spectrum analysis of the product, bands of a secondary hydroxyl group at 3520 cm$^{-1}$; thymine at 1650 cm$^{-1}$ and a carbonyl group at 1715 cm$^{-1}$ were found, whereby the product was confirmed to be the desired polyion complex.

EXAMPLE 6

A 1.6 g sample of the polycation polymer of Example 5 was dissolved in 200 ml of distilled water. On the other hand, 1 g of carboxymethyl cellulose was dissolved in 200 ml of distilled water and the solution of carboxymethyl cellulose was added dropwise to the solution of the polycation polymer at room temperature with stirring. The resulting white precipitate was collected by filtration, was washed with a large amount of water and then with acetone and was dried in vacuum. According to an infrared spectrum analysis of the product, the bands of a secondary hydroxyl group at 3530 cm$^{-1}$; thymine at 1650 cm$^{-1}$ and a carbonyl group at 1720 cm$^{-1}$ were found whereby the product was confirmed to be the desired polyion complex.

tion. A 7 g sample of the polycation polymer having the unit formula

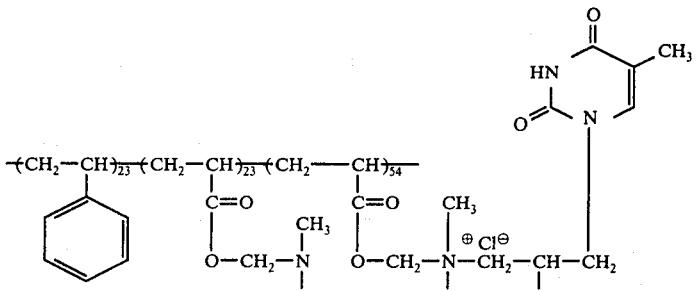

EXAMPLE 7

A 4 g sample of a polycation polymer having the unit formula

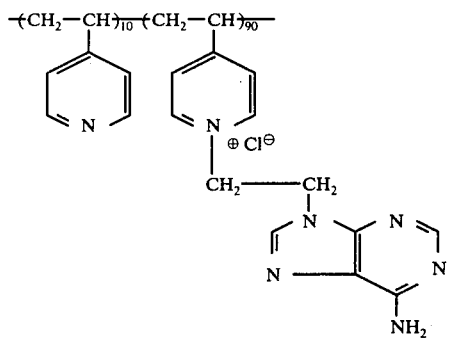

which was produced by heating poly-4-vinylpyridine (MW $1 \times 10^5$) and 9-(2'-chloroethyl)-adenine in N, N-dimethylformamide, was dissolved in 500 ml of distilled water. On the other hand, the solution of polyacrylic acid of Example 5 was also used. In accordance with the process of Example 5, both solutions were mixed and treated to obtain a pale yellow polyion complex. According to an infrared spectrum analysis, the bands of adenine at 1660 cm$^{-1}$ and 1620 cm$^{-1}$ and a carbonyl group at 1720 cm$^{-1}$ were found whereby the product was confirmed to be the desired polyion complex.

EXAMPLE 8

A 4 g sample of the polycation polymer having the unit formula

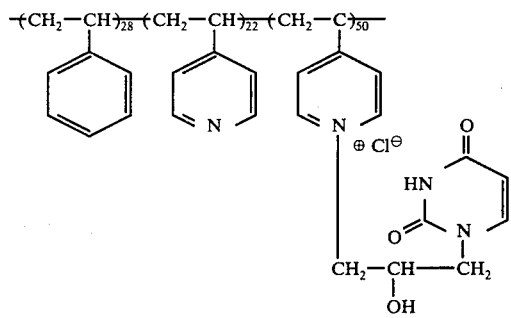

which was produced by heating styrene-4-vinylpyridine copolymer (MW $7 \times 10^5$) and 1-(2'-hydroxy-3'-chloropropyl)-uracile in N, N-dimethylformamide, was dissolved in 500 ml of distilled water to prepare a solution. which was produced by heating styrene-methyl dimethylaminoacrylate copolymer and 1-(2'-hydroxy-3'-chloropropyl)-thymine in N, N-dimethylformamide, was dissolved in 1 liter of distilled water. Both of the solutions of polycation polymers were mixed. The solution of polyacrylic acid of Example 5 was added dropwise to the mixed solution of polycation polymers, and treated in accordance with the process of Example 5. According to an infrared spectrum analysis, the product was confirmed to be the desired polyion complex.

EXAMPLE 9

In a 2 liter beaker, 2 g of the polycation polymer having the unit formula

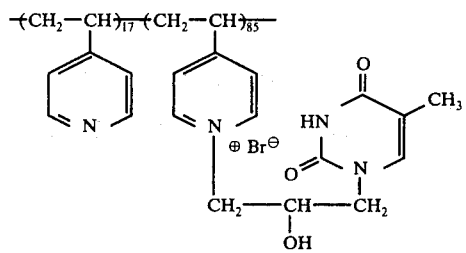

which was produced by heating poly-4-vinylpyridine (MW $1 \times 10^5$) and 1-(2'-hydroxy-3'-bromopropyl)-thymine in N, N-dimethylformamide, was dissolved in 400 ml of distilled water with stirring. In a 500 ml beaker, 1 g of sodium polystyrenesulfonate (MW $5 \times 10^5$) was dissolved in 300 ml of distilled water. The latter solution of polyanion polymer was added to the former solution of polycation polymer at room temperature with stirring over about 30 minutes, whereby a white precipitate was formed. The white precipitate was collected by filtration, was washed with a large amount of water and then washed with acetone and was dried in vacuum to obtain a polyion complex. According to an infrared spectrum analysis of the polyion complex, the bands of a secondary hydroxyl group at 3522 cm$^{-1}$; thymine at 1650 cm$^{-1}$ and SO$_2$ at 1210 cm$^{-1}$ and 1040 cm$^{-1}$ were found. According to an elementary analysis, the nitrogen content was 8.62%. The product was shown to be a polyion complex (substantially neutral) having the following structure.

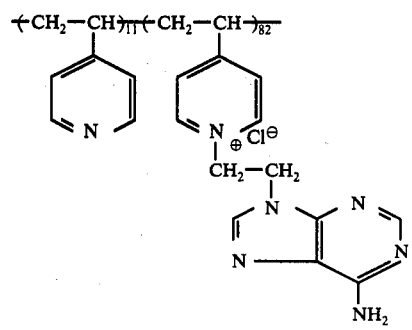

which was produced by heating poly-4-vinylpyridine (MW 1 × 10⁵) and 9-(2'-chloroethyl)-adenine in N, N-dimethylformamide, was dissolved in 400 ml of distilled water with stirring. On the other hand, in another beaker, 1 g of sodium polystyrenesulfonate (MW 5 × 10⁵) was dissolved in 300 ml of distilled water. In accordance with the process of Example 9, both solutions were mixed to obtain the desired polyion complex.

EXAMPLE 12

A 5 g sample of a polycation polymer having the unit formula

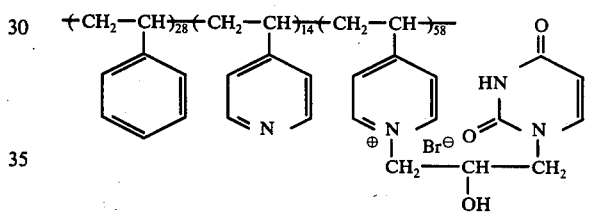

which was produced by heating styrene-4-vinylpyridine copolymer (MW 8.7 × 10⁴) and 1-(2'-hydroxy-3'-bromopropyl)-uracil in N, N-dimethylformamide, was dissolved in 600 ml of distilled water. On the other hand, in another beaker, 1 g of sodium polyacrylate (MW 2 × 10⁵) was dissolved in 400 ml of distilled water. In accordance with the process of Example 9, both solutions were mixed to obtain the desired polyion complex.

Having now fully described the invention, it will be apparent to one of ordinary skill in the art that many changes and modifications can be made thereto without departing from the spirit or scope of the invention as set forth herein.

What is desired as new and intended to be secured by letters patent is:

1. A process for producing a polyion complex which comprises reacting a polyanion polymer with a nucleic acid base-containing polycation polymer having the unit formula

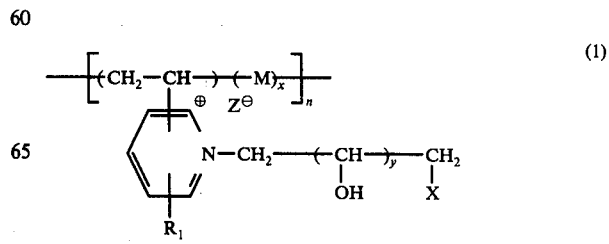

(1)

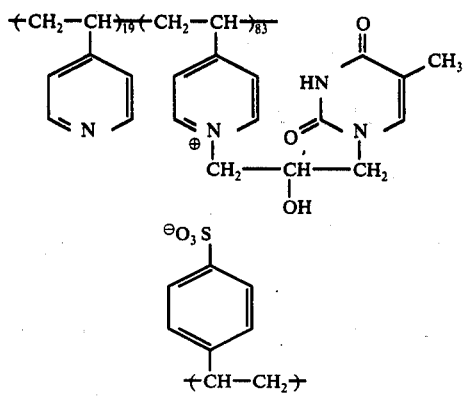

EXAMPLE 10

In a 2 liter beaker, 7 g of a polycation polymer having the unit formula

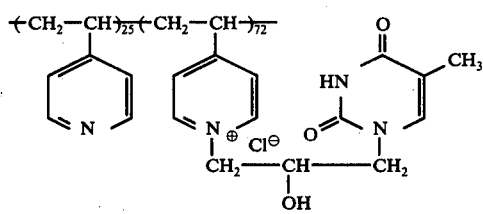

which was produced by heating poly-4-vinylpyridine (MW 1 × 10⁵) and 1-(2'-hydroxy-3'-chloropropyl)-thymine in N, N-dimethylformamide, was dissolved in 800 ml of distilled water with stirring. On the other hand, in another beaker, 2 g of sodium polyacrylate (MW 2 × 10⁵) was dissolved in 700 ml of distilled water. The latter solution of polyanion polymer was added dropwise to the former solution of polycation polymer at room temperature over about 1 hour. The resulting white precipitate was collected by filtration, washed with a large amount of water and washed with acetone and was dried in vacuum. According to an infrared spectrum analysis of the polyion complex, the bands of a secondary hydroxyl group at 3520 cm⁻¹; thymine at 1650 cm⁻¹; and a carbonyl group at 1710 cm⁻¹ were shown. According to an elementary analysis, the nitrogen content was 11.71%. The product was a polyion complex (substantially neutral) having the following structure:

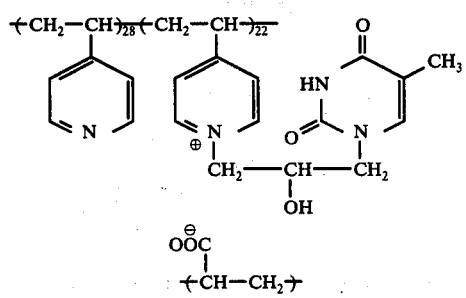

EXAMPLE 11

A 1.8 g sample of a polycation polymer having the unit formula

-continued

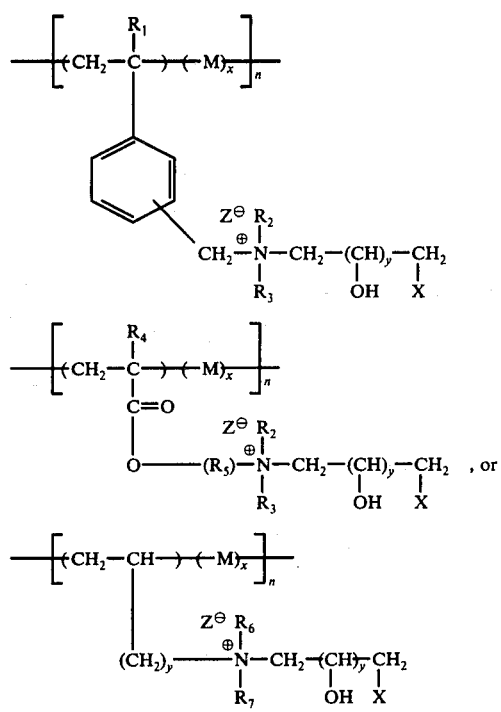

wherein $R_1$ is a hydrogen atom or a $C_{1-4}$ alkyl group; $R_2$ and $R_3$ are each a $C_{1-10}$ hydrocarbon group; $R_4$ is a hydrogen atom or a methyl group; $R_5$ is a $C_{1-6}$ alkyl group; $R_6$ and $R_7$ are each a $C_{1-4}$ alkyl group; M is a vinyl monomer; $x$ is 0 -450,000; Z is a halogen atom or an hydroxyl group; $y$ is 0 or 1; $n$ is an integer higher than 10; X is adenine, thymine, cytosine, uracil or a derivative thereof in which a purine nucleus is bonded to the 9-position and a pyrimidine nucleus is bonded to the 1-position.

2. The process of claim 1, wherein the polycation polymer has the unit formula

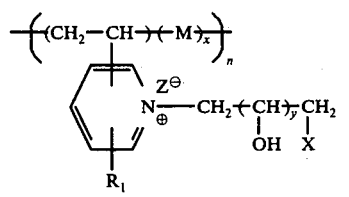

3. The process of claim 1, wherein the polycation polymer has the unit formula

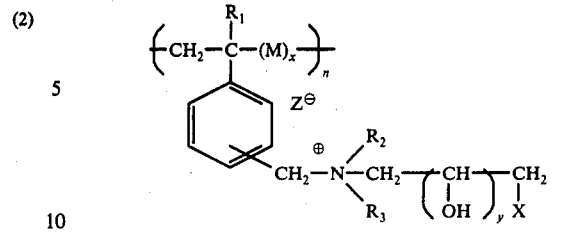

4. The process of claim 1, wherein the polyanion polymer is selected from the group consisting of polystyrenesulfonic acid polymers, polyvinylsulfonic acid polymers, polymaleic acid polymers, copolymers of acrylic acid, methacrylic acid or maleic acid, carboxymethyl cellulose polymers, alginic acid polymers, poly-L-aspartic acid polymers and poly-L-glutamic acid polymers and alkali metal salts thereof.

5. The process of claim 1, wherein the polyanion polymer and the polycation polymer are respectively dissolved in a solvent of water, a water miscible solvent or a mixture thereof, both solutions are admixed and the precipitate is collected.

6. The process of claim 5, wherein said solvent is water, methanol, ethanol, butanol, acetone, tetrahydrofuran or N, N'-dimethylformamide.

7. The process of claim 1, wherein the equivalent ratio of the polycation polymer relative to the polyanion polymer is in the range of from 0.05 to 20.

8. The process of claim 1, wherein the polycation polymer has the unit formula

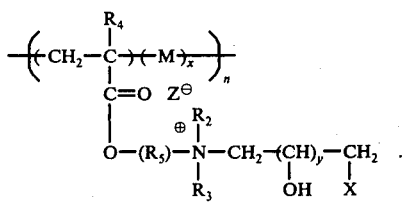

9. The process of claim 1, wherein the polycation polymer has the unit formula

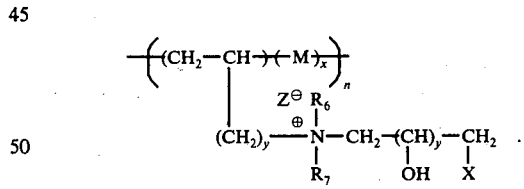

10. The polyion complex prepared by the process of claim 1.

* * * * *